(12) United States Patent
Qu

(10) Patent No.: US 8,971,953 B2
(45) Date of Patent: Mar. 3, 2015

(54) PORTABLE COMMUNICATION DEVICE AND METHOD FOR DIALING PHONE NUMBERS ON KEYPAD OF THE PORTABLE COMMUNICATION DEVICE

(71) Applicant: Kai-Bo Qu, Shenzhen (CN)

(72) Inventor: Kai-Bo Qu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 147 days.

(21) Appl. No.: 13/653,431

(22) Filed: Oct. 17, 2012

(65) Prior Publication Data

US 2013/0225231 A1    Aug. 29, 2013

(30) Foreign Application Priority Data

Feb. 29, 2012  (CN) .......................... 2012 1 0049147

(51) Int. Cl.
   *H04M 1/00*    (2006.01)
(52) U.S. Cl.
   USPC ............ 455/550.1; 455/414.1; 455/418; 455/460; 379/355.01; 379/355.02; 379/93.23; 715/780
(58) Field of Classification Search
   CPC ............. H04L 29/08108; H04M 3/48; H04M 1/72519; H04M 1/2745; H04M 1/274566; H04M 3/42042; G06F 3/0237
   USPC .......................... 455/414.1, 418, 460, 550.1; 379/355.01, 93.23; 715/780
   See application file for complete search history.

(56) References Cited

U.S. PATENT DOCUMENTS

| | | | | |
|---|---|---|---|---|
| 4,491,692 A | * | 1/1985 | Lee ................................. | 362/24 |
| 5,701,123 A | * | 12/1997 | Samulewicz .................... | 341/22 |
| 6,208,339 B1 | * | 3/2001 | Atlas et al. ..................... | 715/780 |
| 6,310,609 B1 | * | 10/2001 | Morgenthaler ................. | 345/170 |
| 6,682,427 B2 | * | 1/2004 | Wolinsky ......................... | 463/41 |
| 6,895,559 B2 | * | 5/2005 | Forder ............................. | 715/780 |
| 8,204,176 B2 | * | 6/2012 | Garrett ............................. | 379/37 |
| 2004/0052355 A1 | * | 3/2004 | Awada et al. .............. | 379/355.01 |
| 2009/0010405 A1 | * | 1/2009 | Toebes .......................... | 379/93.23 |
| 2013/0265225 A1 | * | 10/2013 | Nasiri et al. ................... | 345/156 |

FOREIGN PATENT DOCUMENTS

| | | | |
|---|---|---|---|
| EP | 1146716 | * | 10/2001 |
| JP | 60-162351 | * | 8/1985 |

* cited by examiner

*Primary Examiner* — Steve D Agosta
(74) *Attorney, Agent, or Firm* — Novak Druce Connolly Bove + Quigg LLP

(57) ABSTRACT

In a method for dialing phone numbers using a portable communication device, the device includes a keypad including numeric keys and an LED driver. Each of the numeric keys is equipped with a first color LED light and a second color LED light. The LED driver drives the first LED light under each of the numeric keys to emit a first color light. The LED driver turns off the first LED light under the numeric key and turns on the second LED light under the numeric key to emit a second color light according to an LED control signal. The LED driver further turns off the second LED light and turns on the first LED light to emit the first color light when the digit input from the keypad is in a digital group.

9 Claims, 6 Drawing Sheets

PORTABLE COMMUNICATION DEVICE AND METHOD FOR DIALING PHONE NUMBERS ON KEYPAD OF THE PORTABLE COMMUNICATION DEVICE

BACKGROUND

1. Technical Field

Embodiments of the present disclosure relate to communication devices and methods, and particularly to a portable communication device and a method for dialing phone numbers on a keypad of the portable communication device.

2. Description of Related Art

Portable communication devices, such as mobile phones, personal digital assistants, mobile terminals, etc., typically include a keypad that allows data entry by the user including, for example, the dialing of a phone number to initiate a call. Such devices provide shortcut key sequences that permit rapid dialing of pre-stored phone numbers. The user may dial phone numbers by pressing keys from the keypad to initiate a call. In such cases, the user may inadvertently press the wrong keys from the keypad. However, there is no effective mechanism for guiding the user to press the phone number on the keypad. Therefore, there is room for improvement of the portable communication devices.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of a non-transitory computer-readable medium include CDs, DVDs, flash memory, and hard disk drives.

Figure 1:
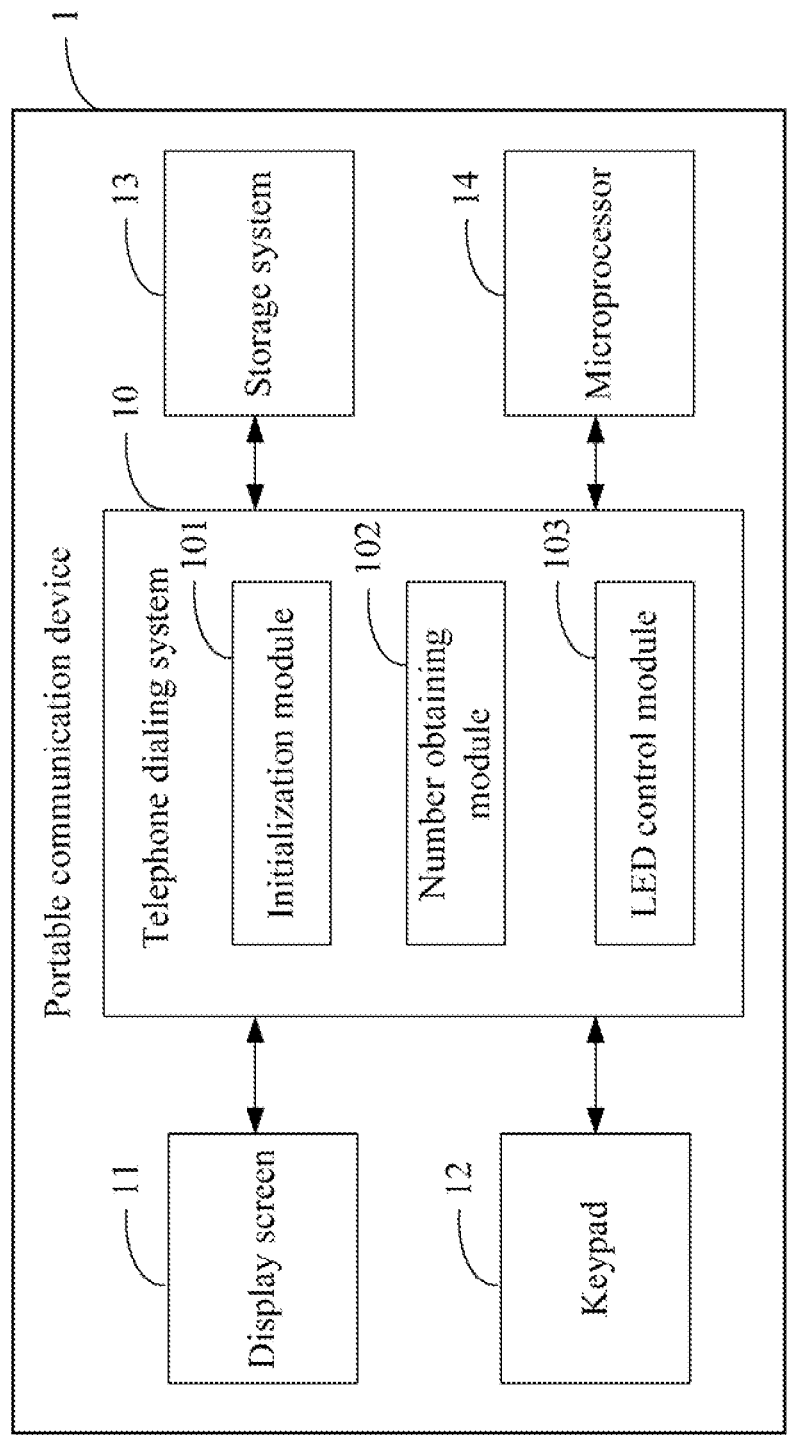
FIG. 1 is a block diagram of one embodiment of a portable communication device.

FIG. 1 is a block diagram of one embodiment of a portable communication device 1. In the embodiment, the portable communication device 1 includes a telephone dialing system 10, a display screen 11, a keypad 12, a storage system 13, and at least one microprocessor 14. In one embodiment, the telephone dialing system 10 may include a plurality of functional modules that are stored in the storage system 13 and executed by the at least one microprocessor 14. FIG. 1 is only one example of the portable communication device 1, other examples may include more or fewer components than those shown in the embodiment, or have a different configuration of the various components.

The portable communication device 1 may be a mobile phone, a personal digital assistant (PDA), or a mobile terminal, for example. The display screen 11 is a LED screen or a touch screen that displays a phone number when a user presses keys from the keypad 12. The keypad 12 allows data or numbers entry by the user, for example, dialing of a phone number to initiate a call.

Figure 2A:
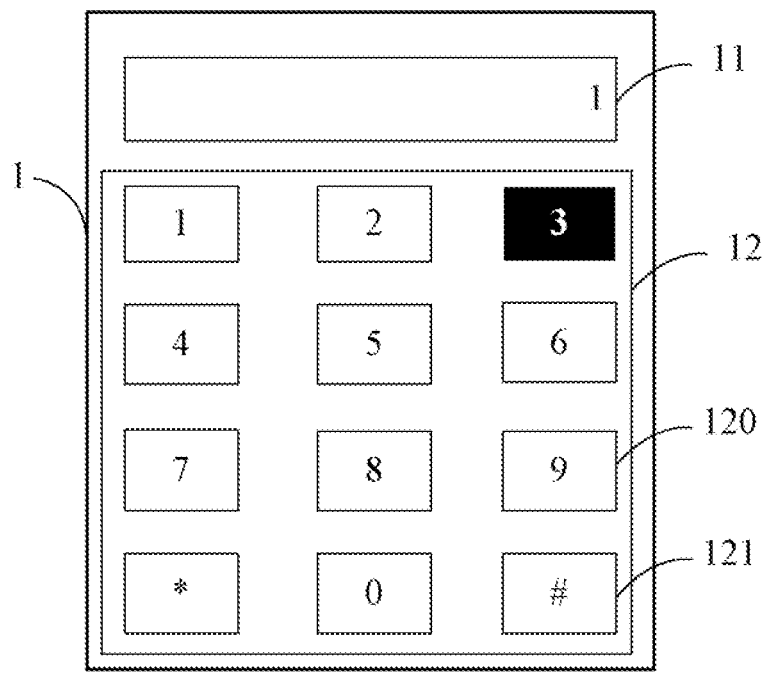
FIGS. 2A-2B are examples of dialing a phone number on a keypad of the portable communication device.
Figure 3:
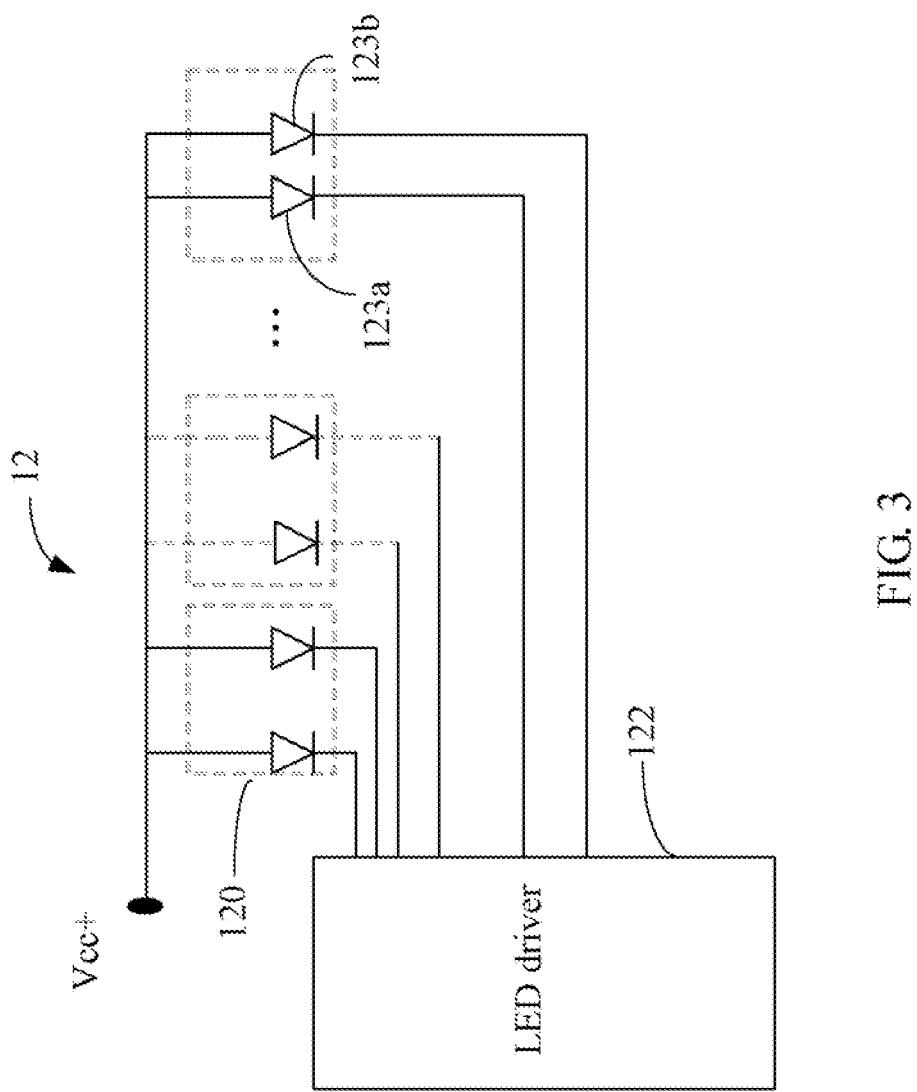
FIG. 3 is a schematic diagram illustrating an interior structure of the keypad.

The keypad 12 includes a plurality of numeric keys 120, symbol keys 121, and an LED driver 122 (see FIG. 3). Referring to FIG. 2A, the keypad 12 includes ten numeric keys 120, i.e., from the numeric key "0" to the numeric key "9". The symbol keys 121 may include a symbol key "*" and a symbol key "#", for example.

FIG. 3 is a schematic diagram illustrating an interior structure of the keypad 12. In FIG. 3, each of the numeric keys 120 and each of the symbol keys 121 is equipped with two different color LED lights, i.e., a first color LED light 123a and a second color LED light 123b. In one embodiment, the first color LED light 123a emits a blue light, and the second color LED light 123b emits a red light. In some embodiments, the first color LED light 123a may emit other color lights such as a green light, and the second color LED light 123b may emit other color lights such as a yellow light. The LED driver 122 controls the first color LED light 123a and the second color LED light 123b to turn off or on, so that each of the numeric keys 120 may present different color light when the user dials a phone number from the keypad 12.

In one embodiment, the storage system 13 may be an internal storage system, such as a random access memory (RAM) for the temporary storage of information, and/or a read only memory (ROM) for the permanent storage of information. In some embodiments, the storage system 13 may also be an external storage system, such as an external hard disk, a storage card, or a data storage medium. The storage system 13 stores a phone number list that stores a plurality of pre-stored phone numbers. For example, the phone number list stores a phone number "13125684500", a phone number "13775625467", and a phone number "13757678111". The microprocessor 14 may be a microcontroller unit that processes computerized instructions and data for dialing of a phone number to initiate a call.

In one embodiment, the telephone dialing system 10 includes an initialization module 101, a number obtaining module 102, and an LED control module 103. The modules 101-103 may comprise computerized instructions in the form of one or more programs that are stored in the storage system 13 and executed by the at least one microprocessor 14. Detailed descriptions of each module will be given in FIG. 6 as described in the following paragraphs.

Figure 6:
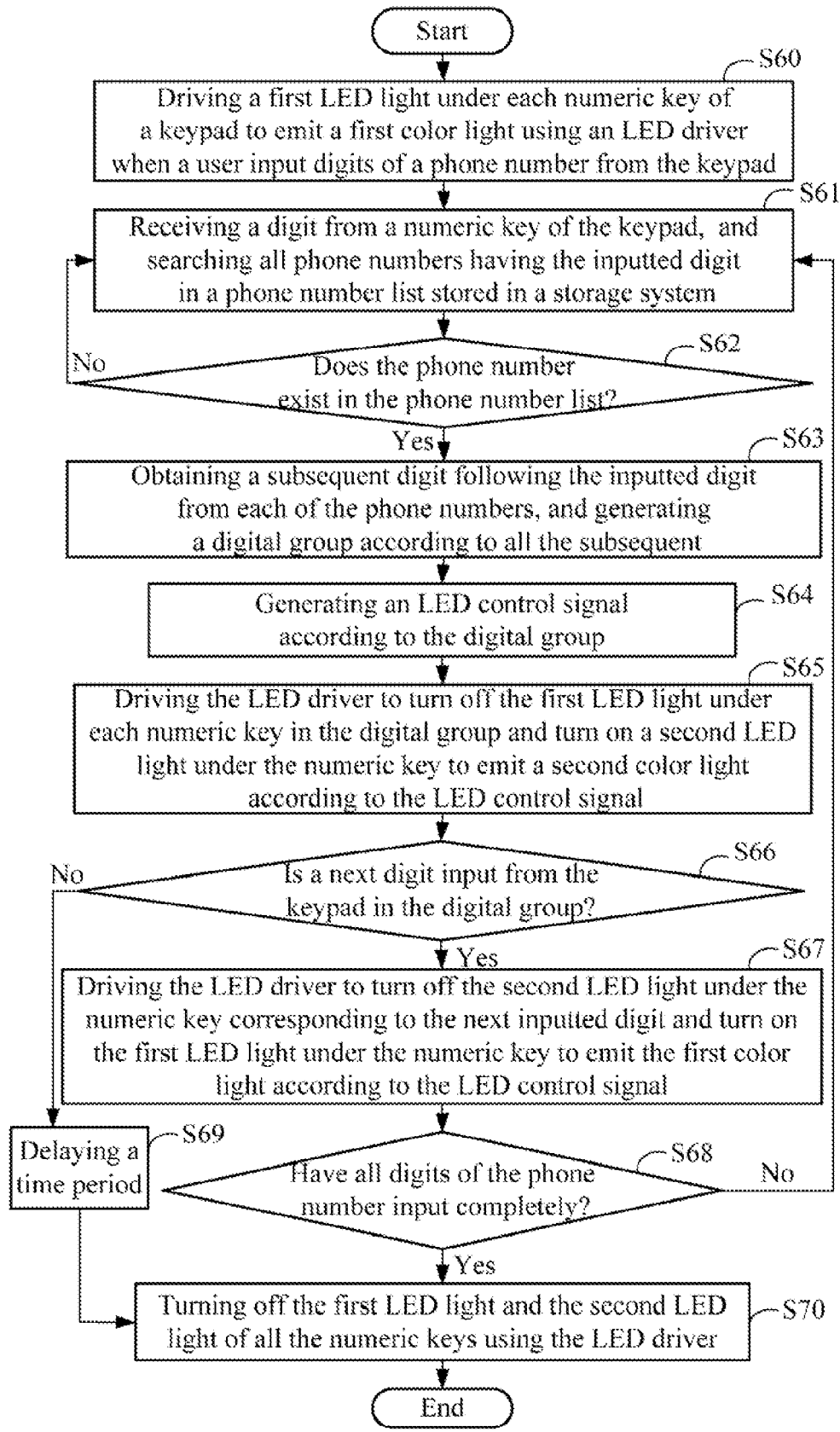
FIG. 6 is a flowchart of one embodiment of a method for dialing a phone number using the keypad of the portable communication device of FIG. 1.

FIG. 6 is a flowchart of one embodiment of a method for dialing a phone number on the keypad 12 of the portable communication device 1 of FIG. 1. The method can search a phone number from the phone number list stored in the storage system 13, and emit different color lights from the numeric keys 120 of the keypad 12 according to the phone number, so as to guide the user to press the numeric keys 120 on the keypad 12 when the user dials the phone number from the keypad 12. Depending on the embodiment, additional steps may be added, others removed, and the ordering of the steps may be changed.

In step S60, the initialization module 101 drives the first LED light 123a under each of the numeric keys 120 of the keypad 12 to emit a first color light using the LED driver 122, when the user inputs digits of a phone number from the keypad 12. Referring to FIG. 3, the initialization module 101 turns on the first LED light 123a of each of the numeric keys 120 to emit the first color light such as a blue light, so that each of the numeric keys 120 shows the blue light on the surface of each of the numeric keys 120.

Figure 2B:
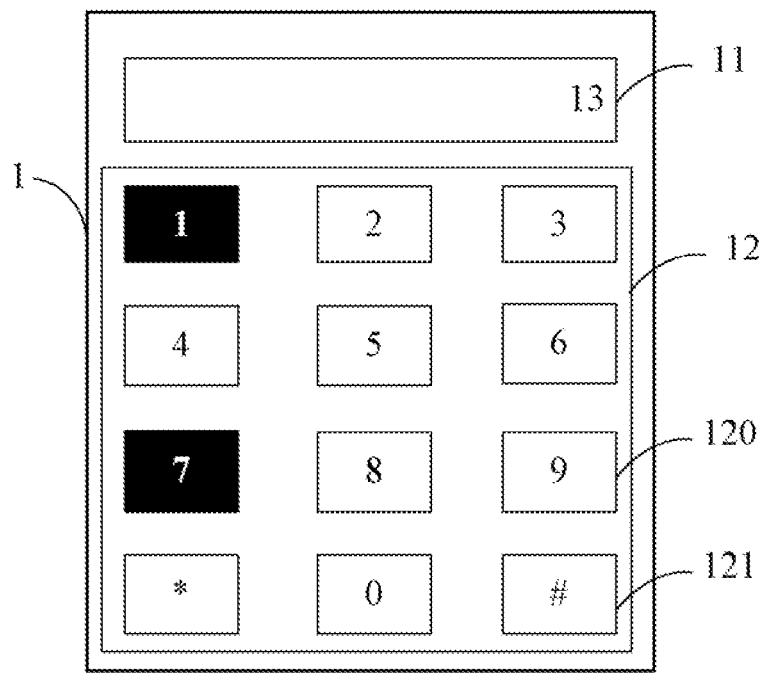

In step S61, the number obtaining module 102 receives a digit inputted from a numeric key 120 of the keypad 12, and searches all phone numbers having the inputted digit in the phone number list stored in the storage system 13. Referring to FIG. 2A, if the user presses the numeric key "1" on the keypad 12, the number obtaining module 102 searches all the phone numbers including the number "1" from the phone number list. Referring to FIG. 2B, if the user presses the numeric key "3" on the keypad 12, the number obtaining module 102 searches all the phone numbers including the number "3" from the phone number list.

In step S62, the number obtaining module 102 determines whether the phone number exists in the phone number list. If the phone number exists in the phone number list, step S63 is implemented. Otherwise, if the phone number does not exist in the phone number list, step S61 is implemented.

In step S63, the number obtaining module 102 obtains a subsequent digit following the inputted digit from each of the phone numbers, and generates a digital group according to all of the subsequent digits. For example, if the user presses the numeric key "1" on the keypad 12, the number obtaining module 102 obtains all subsequent digits including the digit "3" following the digit "1" from each of the phone numbers. When the user presses the numeric key "3" on the keypad 12, the number obtaining module 102 obtains all subsequent digits including the digit "1" and the digit "7" following the digit "3" from each of the phone numbers, and groups the digit "1" and the digit "7" to generate a digital group denoted as [1, 7].

In step S64, the LED control module 103 generates an LED control signal according to all the digits of the digital group. The LED control signal is used to control the first color LED light 123a or the second first color LED light 123b to emit different color lights.

In step S65, the LED control module 103 drives the LED driver 122 to turn off the first LED light 123a under the numeric key 120 in the digital group, and turns on the second LED light under the numeric key 120 to emit a second color light according to the LED control signal.

Figure 4:
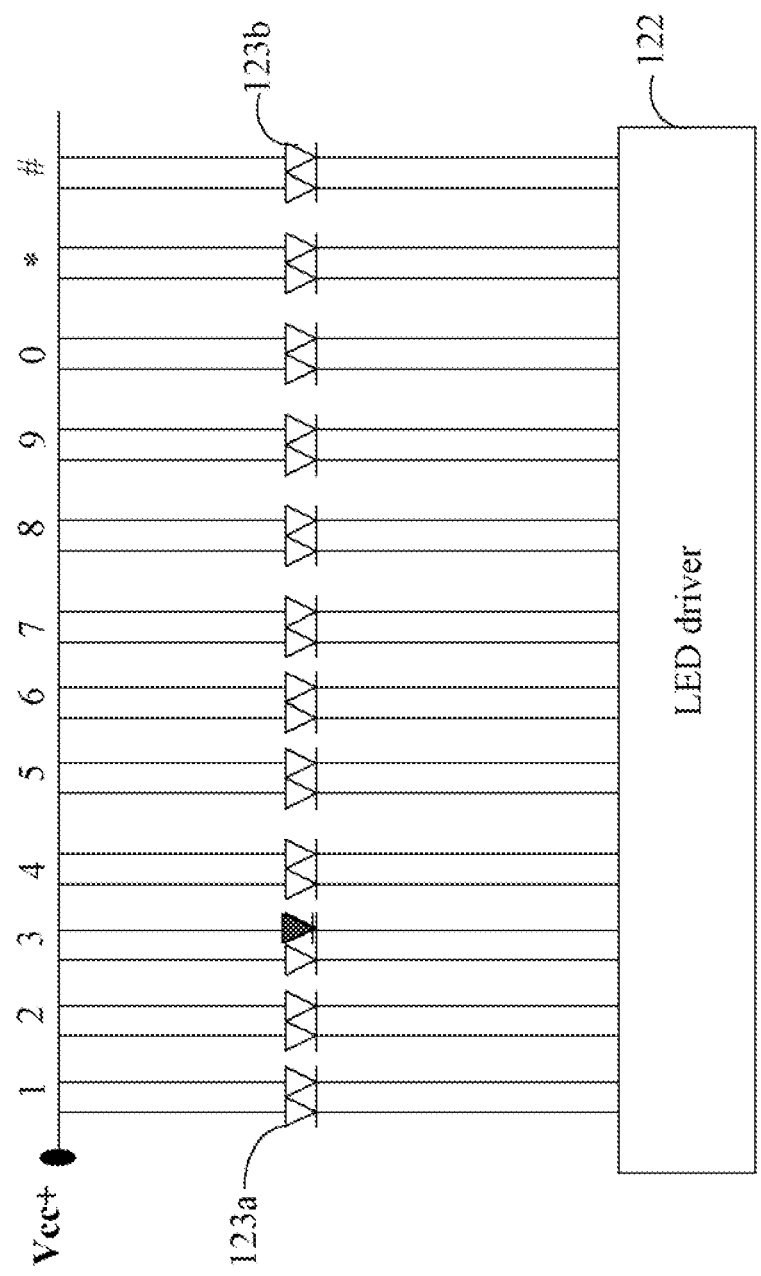
FIG. 4 is a schematic diagram illustrating one example of changes of the LED lights of the keypad.

FIG. 4 is a schematic diagram illustrating one example of changes of the LED lights of the keypad 12. When the user inputs the digit "3" of the phone number from the keypad 12, the LED control module 103 turns off the first LED light 123a under the numeric key "3" using the LED driver 122, and turns on the second LED light under the numeric key "3" to emit the second color light, such as a red light. Referring to FIG. 2A, the numeric key "3" shows a red light that is different from other numeric keys 120, so as to reminder the user should presses the numeric key "3" on the keypad 12.

Figure 5:
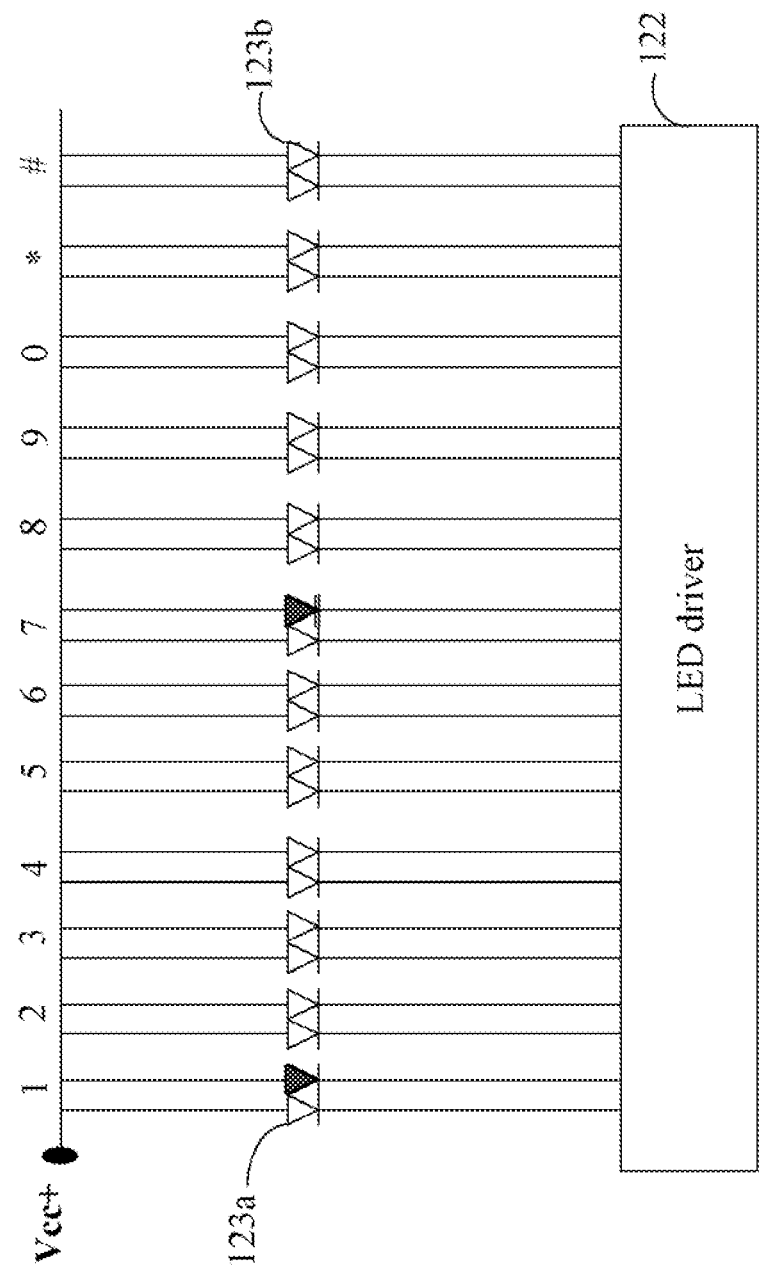
FIG. 5 is a schematic diagram illustrating another example of changes of the LED lights of the keypad.

FIG. 5 is a schematic diagram illustrating another example of changes of the LED lights of the keypad 12. When the user dials the phone number including the digital group [1, 7], the LED control module 103 turns off the first LED light 123a under the numeric key "3" and the numeric key "7" using the LED driver 122, and turns on the second LED light under the numeric key "3" and the numeric key "7" to emit the second color light, such as a red light. Referring to FIG. 2B, both of the numeric key "3" and the numeric key "7" both show red lights that are different from other numeric keys 120, so as to prompt the user to press either the numeric key "3" or the numeric key "7" on the keypad 12.

In step S66, the number obtaining module 102 determines whether a next digit inputted from the keypad 12 is in the digital group. If the next inputted digital is in the digital group, step S67 is implemented. Otherwise, if the next inputted digit is not in the digital group, step S69 is implemented.

In step S67, the LED control module 103 drives the LED driver 122 to turn off the second LED light 123b under a numeric key 120 corresponding to the next inputted digit, and turns on the first LED light 123a under the numeric key 120 to emit the first color light according to the LED control signal.

In step S68, the number obtaining module 102 determines whether all digits of the phone number have been inputted from the keypad 12 according to a length of the phone number. If other digits of the phone number need to input from the keypad 12, step S61 is implemented. If all digits of the phone number have been input from the keypad 12, step S70 is implemented.

In step S69, the LED control module 103 delays a time period such as two seconds, for waiting for another digit of the phone number to be inputted from the keypad 12. In step S70, the LED control module 103 turns off the first LED light 123a and the second LED light 123b under all the numeric keys 120 using the LED driver 122.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A portable communication device, comprising:
  a keypad comprising a plurality of numeric keys and an LED driver, each of the numeric keys equipped with a first color LED light and a second color LED light, wherein the first color LED light emits a blue light or a green light; and
  a telephone dialing system comprising one or more programs that is stored in a storage system and executed by at least one microprocessor, the one or more programs comprising:
  an initialization module that drives the first LED to light under each of the numeric keys to emit a first color light using the LED driver when a user inputs a first digit of a phone number from the keypad;
  a number obtaining module that receives a digit inputted from a numeric key of the keypad, searches all phone numbers having the inputted digit in a phone number list stored in the storage system, obtains a subsequent digit following the inputted digit from each of the phone numbers, and generates a digital group according to all the subsequent digits; and
  an LED control module that generates an LED control signal according to the digital group, drives the LED driver to turn off the first LED light under the numeric key in digital group and turn on the second LED light under the numeric key to emit a second color light according to the LED control signal, determines whether a next digit input from the keypad is in the digit group, and drives the LED driver to turn off the second LED light under a numeric key corresponding to the next inputted digit and turn on the first LED light under the numeric key to emit the first color light when the next inputted digit is in the digital group;

wherein the number obtaining module further determines whether all digits of the phone number have been inputted from the keypad according to a length of the phone number; and wherein the LED control module further turns off the first LED light and the second LED light under all the numeric keys using the LED driver when all the digits of the phone number have been inputted from the keypad.

2. The portable communication device according to claim 1, wherein the keypad further comprises a plurality of symbol keys, and each of the symbol keys is equipped with the first color LED light and the second color LED light.

3. The portable communication device according to claim 1, wherein the second color LED light emits a red light or a yellow light.

4. A method for dialing a phone number using a portable communication device, the method comprising:

driving a first LED light under each numeric key to emit a first color light using an LED driver when a user inputs a first digit of the phone number from a keypad, wherein the keypad comprises a plurality of numeric keys and the LED driver, and each of the numeric keys is equipped with the first color LED light and a second color LED light, wherein the first color LED light emits a blue light or a green light;

receiving a digit inputted from a numeric key of the keypad, and searching all phone numbers having the inputted digit in a phone number list stored in a storage system;

obtaining a subsequent digit following the inputted digit from each of the phone numbers, and generating a digital group according to all the subsequent digits;

generating an LED control signal according to the digital group;

driving the LED driver to turn off the first LED light under the numeric key in the digital group and turn on the second LED light under the numeric key to emit a second color light according to the LED control signal;

determining whether a next digit input from the keypad is in the digital group;

driving the LED driver to turn off the second LED light under a numeric key corresponding to the next inputted digit and turn on the first LED light under the numeric key to emit the first color light when the next inputted digit is in the digital group;

determining whether all digits of the phone number have been inputted from the keypad according to a length of the phone number; and turning off the first LED light and the second LED light under all the numeric keys using the LED driver when all the digits of the phone number have been inputted from the keypad.

5. The method according to claim 4, wherein the keypad further comprises a plurality of symbol keys, and each of the symbol keys is equipped with the first color LED light and the second color LED light.

6. The method according to claim 4, wherein the second color LED light emits a red light or a yellow light.

7. A non-transitory computer-readable storage medium having stored thereon instructions that, when executed by at least one microprocessor of a portable communication device, causes the device to perform a method for dialing a phone number, the method comprising:

driving a first LED light under each numeric key to emit a first color light using an LED driver when a user inputs a first digit of the phone number from a keypad, wherein the keypad comprises a plurality of numeric keys and the LED driver, and each of the numeric keys is equipped with the first color LED light and a second color LED light, wherein the first color LED light emits a blue light or a green light;

receiving a digit inputted from a numeric key of the keypad, and searching all phone numbers having the inputted digit in a phone number list stored in a storage system;

obtaining a subsequent digit following the inputted digit from each of the phone numbers, and generating a digital group according to all the subsequent digits;

generating an LED control signal according to the digital group;

driving the LED driver to turn off the first LED light under the numeric key in the digital group and turn on the second LED light under the numeric key to emit a second color light according to the LED control signal;

determining whether a next digit input from the keypad is in the digital group; driving the LED driver to turn off the second LED light under a numeric key corresponding to the next inputted digit and turn on the first LED light under the numeric key to emit the first color light when the next inputted digit is in the digital group;

determining whether all digits of the phone number have been inputted from the keypad according to a length of the phone number; and turning off the first LED light and the second LED light under all the numeric keys using the LED driver when all the digits of the phone number have been inputted from the keypad.

8. The storage medium according to claim 7, wherein the keypad further comprises a plurality of symbol keys, and each of the symbol keys is equipped with the first color LED light and the second color LED light.

9. The storage medium according to claim 7, wherein the second color LED light emits a red light or a yellow light.

* * * * *